United States Patent
Kodavalla (10) Patent No.: US 7,916,219 B2
(45) Date of Patent: Mar. 29, 2011

(54) SYSTEM AND METHOD FOR DYNAMIC GAMMA CORRECTION IN DIGITAL VIDEO

(75) Inventor: Vijay Kumar Kodavalla, Bangalore (IN)

(73) Assignee: WIPRO Limited, Bangalore, Karnataka (IN)

( * ) Notice: Subject to any disclaimer, the term of this patent is extended or adjusted under 35 U.S.C. 154(b) by 1198 days.

(21) Appl. No.: 11/458,397

(22) Filed: Jul. 19, 2006

(65) Prior Publication Data

US 2008/0018800 A1 Jan. 24, 2008

(51) Int. Cl.
*H04N 5/14* (2006.01)
*H04N 5/202* (2006.01)

(52) U.S. Cl. .......... 348/672; 348/671; 348/674

(58) Field of Classification Search .......... 348/671–672, 348/673–682, 699–700, 254; 345/596, 589, 345/684; 382/168–172, 162, 165, 25, 274–275
See application file for complete search history.

(56) References Cited

U.S. PATENT DOCUMENTS

| | | | | |
|---|---|---|---|---|
| 6,018,588 A * | 1/2000 | Kim | ......... | 382/167 |
| 7,003,153 B1 * | 2/2006 | Kerofsky | ......... | 382/168 |
| 7,110,046 B2 * | 9/2006 | Lin et al. | ......... | 348/679 |
| 7,369,183 B2 * | 5/2008 | Oka et al. | ......... | 348/674 |
| 2003/0161549 A1 * | 8/2003 | Lei et al. | ......... | 382/274 |

* cited by examiner

*Primary Examiner* — Trang U Tran (74) *Attorney, Agent, or Firm* — Prakash Nama; Global IP Services, PLLC (57) ABSTRACT

A technique for improving image quality using dynamic gray scale correction, in one example embodiment, includes dynamically computing non-linear gamma curves using histogram data extracted from a current video frame. A gray scale correction is then dynamically applied to each pixel in the current or next video frame as a function of the computed non-linear gamma curves.

15 Claims, 7 Drawing Sheets

SYSTEM AND METHOD FOR DYNAMIC GAMMA CORRECTION IN DIGITAL VIDEO

TECHNICAL FIELD OF THE INVENTION

The present invention relates generally to digital video processing, and more particularly relates to image quality enhancement using dynamic gray scale correction of a video luminance signal.

BACKGROUND OF THE INVENTION

A gray scale value correction over specific regions of dynamic range per image from image sequences called "Dynamic Gamma Correction" (DGC) is normally carried-out on video luminance signal. This is a correction performed on luminance signal in accordance with image characteristics thereof. This process generally adjusts the gamma curve of the image over specific regions, thus providing image feature details and contrast enhancement there by improving the overall image quality.

Conventional techniques use either analog or digital dynamic gamma correction (DGC) implementation techniques to perform this task on a frame-by-frame basis. The analog DGC is implemented by modifying gamma reference voltages of the liquid crystal display (LCD) panel. The gamma reference voltages are either generated by using digital-to-analog converter (DAC) devices or by using analog memory.

Typically, the digital DGC implementations are performed either by using piecewise linear (PWL) approximation or look-up table (LUT) techniques. In the PWL method, transfer characteristic curve is piecewise linear approximated. Since non-linear relationship exists between input and intensity response of the display devices, a close approximation of PWL to non-linear characteristics is required. Some of the limitations with the PWL method are that the transfer characteristic curve can have segments with varying slopes and/or sharp transitions and can suffer from visible image artifacts and the number of curve segments and bins in histogram needs to be high for close approximation, which can lead to requiring complex algorithm and more logic for implementation.

In the LUT method, pre-computed characteristics curves are generally stored in memory and depending on the input image characteristics one of the curve values in the memory is selected and used. In this method, each curve data needs to be stored separately and hence number of curves available to make the gamma correction is limited by the memory size. Further, both these techniques require switching characteristics curves on a per image basis. This can result in flicker if curve changes are not adaptable to fast or slow moving image sequences.

For example, if incoming image scene characteristics are changing slowly, at a certain point, curve switching can occur due to drastic differences in histograms. This sudden change in curve will cause flicker in slowly moving sequences. Note that though the image characteristics are changing slowly, histograms might show a huge difference. However, this flicker may not occur with fast changing scenes, as sudden curve change may not be as visible as in the slow changing scenes. Typically, a histogram temporal filtering technique has been used for curve changes to overcome the flicker problem in the fast or slow moving image sequences. One difficulty with using such histogram temporal filtering is the requirement of highly intensive computation of filter coefficients, which are dependent on unpredictable rate of scene changes in fast or slow moving image sequences.

SUMMARY OF THE INVENTION

According to an aspect of the subject matter, there is provided a method for dynamically applying gray scale correction on a frame-by-frame basis to an incoming digital input video signal, comprising the steps of dynamically computing non-linear gamma curves using histogram data extracted from a current video frame, and applying a gray scale correction to each pixel in the current or next video frame as a function of the computed non-linear gamma curves.

BRIEF DESCRIPTION OF THE DRAWINGS

Embodiments of the invention will now be described, by way of example only, with reference to the accompanying drawings in which.

DETAILED DESCRIPTION OF THE INVENTION

In the following detailed description of the various embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

The terms "image" and "video frame" are used interchangeably throughout the document. Further, the term "image sequence" means video frames. Furthermore, the terms "dynamic gamma correction" and "dynamic gray scale correction" are used interchangeably throughout the document. Also, the terms "luma" or "luminance" means gray scale value.

Figure 1:
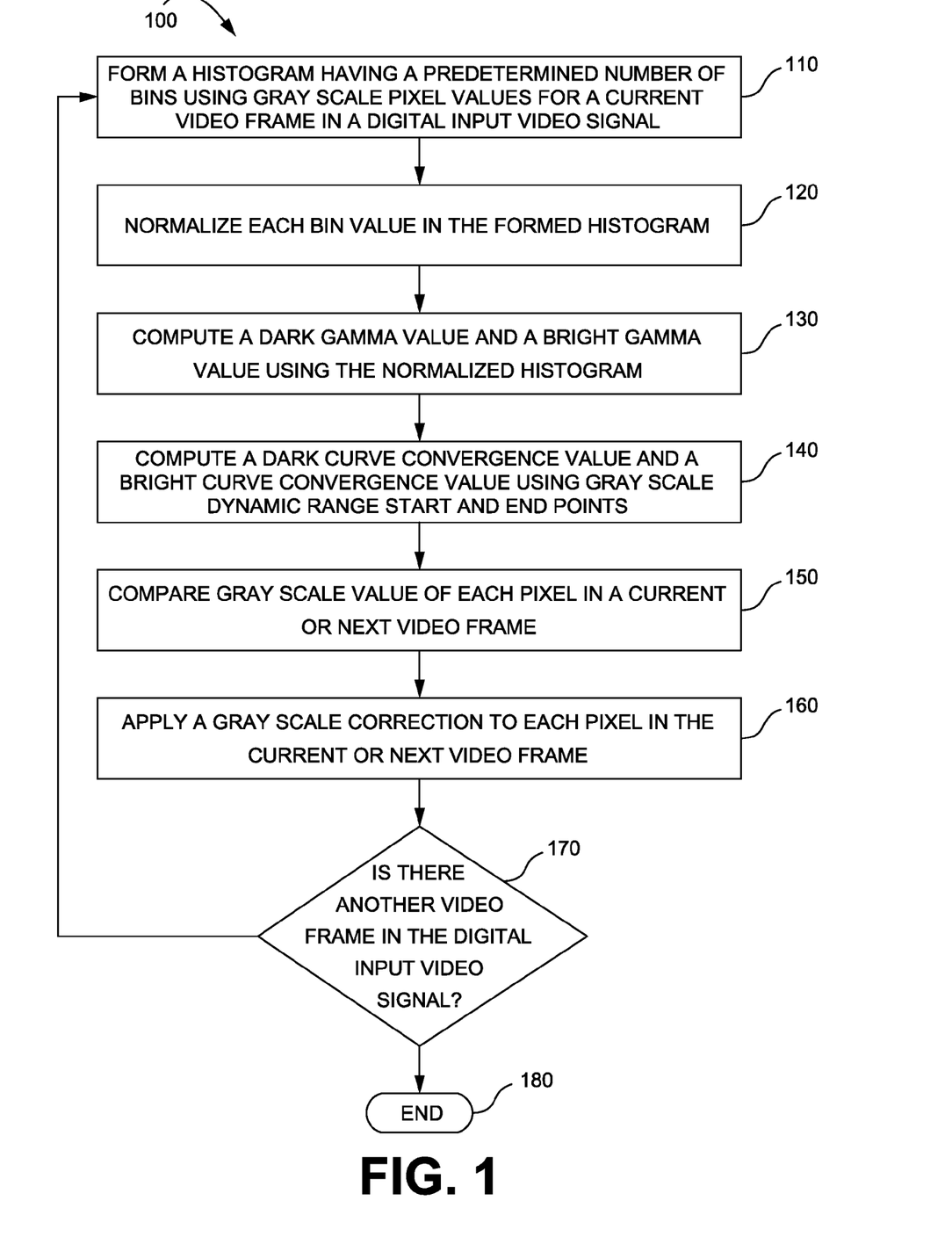
FIG. 1 is a flowchart illustrating an algorithm for dynamically applying gray scale correction on a frame-by-frame basis for an incoming digital input video signal according to an embodiment of the present subject matter.

FIG. 1 illustrates an example method 100 for image quality enhancement for a digital video signal. At step 110, this example method 100 begins by forming a histogram having a predetermined number of bins using image luma (Y) pixel values in a current video frame in an incoming digital video signal.

In some embodiments, the size of each bin in the histogram has substantially equal divisions of full gray scale dynamic range in the current video frame. In these embodiments, each video frame in the incoming digital input video signal has (m×n) pixels. Further in these embodiments, the gray scale dynamic range is equally divided into N different regions which are called bins, wherein N is an integer. The bin size and bin range are computed using the below equations.

$$B_s = (C_{ep} - C_{sp})/N$$

$$BIN[i] = \{(i-1)*B_s)\} + C_{sp} \text{ to } \{(i*B_s)-1\} + C_{sp}$$

Wherein $B_s$ is bin size, BIN[i] is bin range for i=1 to N, and $C_{sp}$ and $C_{ep}$ are starting and ending points of the gray scale (Y) dynamic range. The gray scale dynamic range between $C_{sp}$ and $C_{ep}$ points is considered for curve correction. In the example histogram 200 shown in FIG. 2, the $C_{sp}$ and $C_{ep}$ are 0 and 1023. However, this technique can be applied using any values such that $(C_{ep} - C_{sp})$ is an integer multiple of N, which are considered as lowest and highest for a given gray scale dynamic range. By appropriately configuring $C_{sp}$ and $C_{ep}$ to values other than 0 and 1023, desired curve correction can be obtained in the intentional black and white fill areas of the image.

In forming the histogram, appropriate bin counters are incremented by a value equivalent to resolution factor for every incoming valid pixel in the current video frame that lies in the bin. This factor can be configured based on the resolution (m×n pixels) of the incoming video frames in the digital input video signal. The resolution factor is computed using the below equation.

Resolution factor=1/Active Resolution of the image

Figure 2:
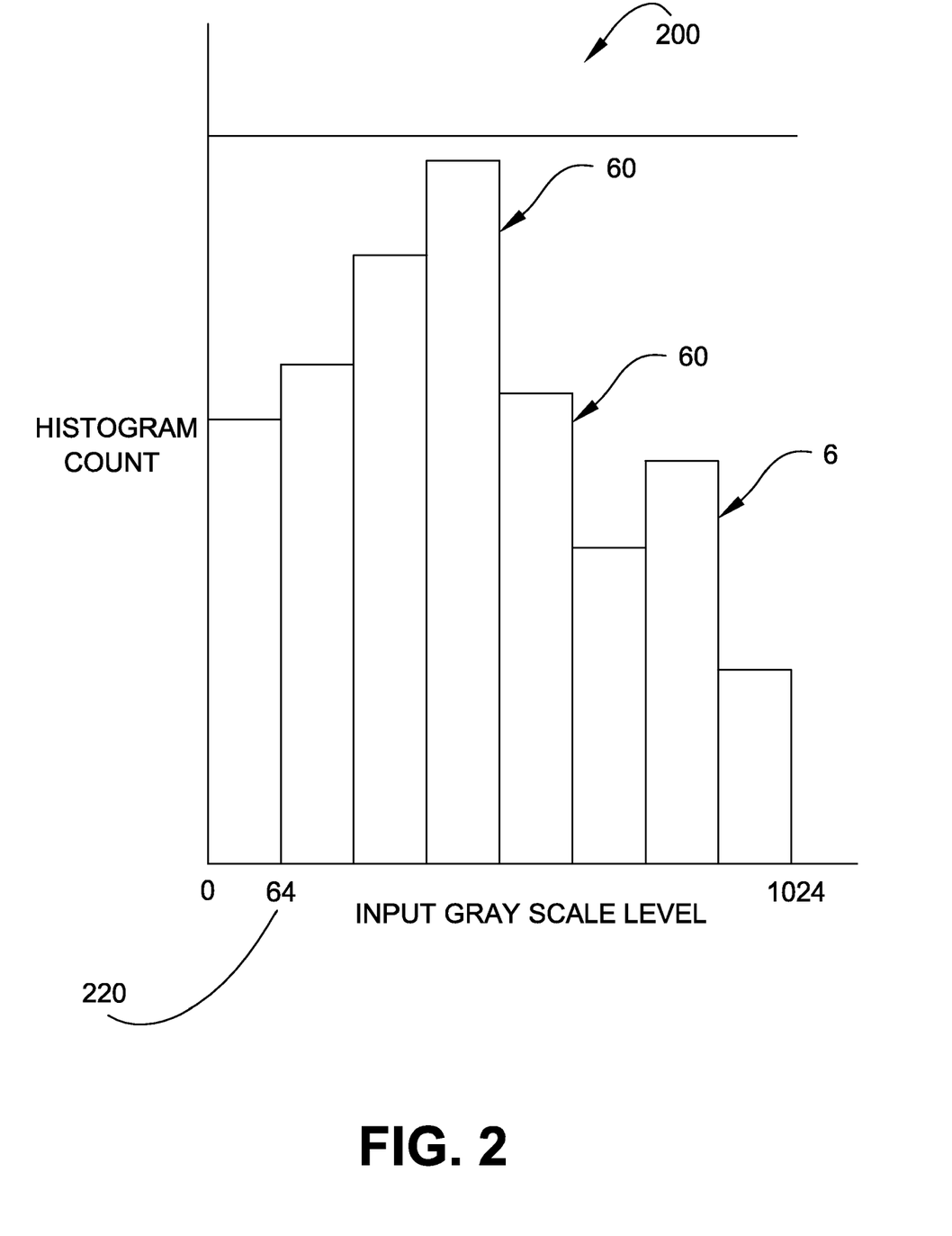
FIG. 2 is a diagram showing an example 8-bin histogram formed according to an embodiment of the present subject matter.

In these embodiments, for a 10-bit gray scale representation, the predetermined number of bins is about 8 to 1024 as shown in the histogram 200 in FIG. 2. Also in these embodiments, for an 8-bit gray scale representation, the predetermined number of bins is about 8 to 256. The present technique generally requires forming about 8 bins and do not justify the amount of additional logic needed for more than 8 bins in the histogram. In these embodiments, the seven most significant bits of each bin counters are named as $p_{NA}$, $p_{NB}$, $p_{NC}$, $p_{ND}$, $p_{NE}$, $p_{NF}$, $p_{NG}$ and $p_{NH}$. These are used for evaluating dark gamma value and bright gamma value at the end of each video frame along with the vertical sync ($V_{sync}$).

As shown in FIG. 2, size of each bin 60 in the histogram 200 is based on an equal division of full gray scale (Y) dynamic range of brightness (or the respective input gray level for each pixel) as represented by the horizontal axis 220 (or the brightness axis). The height of each bin 60 represents the proportion of pixels in the current video frame having luminance intensities within the different predefined ranges for each respective bin. The left region of the histogram 200 represents the darkest portions and the right region of the histogram 200 represents the brightest portion of a video frame.

At step 120, each obtained bin value is normalized. In some embodiments, the bin values are normalized using bin values in the range of 0 to 1 in steps of 0.01. In some embodiments, bin values are normalized by incrementing bin counters by appropriate resolution factor as explained above.

At step 130, a dark gamma value and a bright gamma value is computed using normalized bin values in each bin associated with the current video frame. In some embodiments, normalized bin peak and sum values and dark, bright, and contrast thresholds are obtained using each normalized bin value. Further in these embodiments, the dark gamma value and the bright gamma value are computed using normalized bin peak and sum values and dark, bright, and contrast thresholds associated with each normalized bin value. In some embodiments, the dark gamma value and the bright gamma value are computed using the equations shown in Table-1. This example algorithm determines the amount of gamma to be applied as well as when to switch the curve. If none of the above mentioned conditions are met for dark correction, bright correction, both dark/bright correction and contrast enhancement, the image is considered to be of good quality and will be bypassed for dynamic gray scale correction.

TABLE 1

1. Dark enhancement:
If ($p_{NA} + p_{NB} + p_{NC} > Th_1$)
  $Pk_d$ = peak ($p_{NA}, p_{NB}, p_{NC}$);  → find peak value of the bins
  $Sum_{db}$ = sum ($p_{NA}, p_{NB}, p_{NC}$);  → find sum of the bins $$\gamma_d = \text{Gamma dark} = 1 - \frac{Pk_d \cdot (Sum_{db} - Th_1)}{Th_1}$$

$\gamma_b$ = Gamma bright = 1

2. Bright enhancement (if 1 is false):
If ($p_{NF} + p_{NG} + p_{NH} > Th_1$)
  $Pk_b$ = peak ($p_{NF}, p_{NG}, p_{NH}$);  → find peak value of the bins
  $Sum_{bb}$ = sum ($p_{NF}, p_{NG}, p_{NH}$);  → find sum of the bins
  $\gamma_d$ = Gamma dark = 1

$$\gamma_b = \text{Gamma bright} = 1 - \frac{Pk_b \cdot (Sum_{db} - Th_1)}{Th_1}$$

3. Both bright and dark enhancement (if 1 and 2 are false):
If ($p_{NA} + p_{NB} + p_{NC} > Th_2$ and $p_{NF} + p_{NG} + p_{NH} > Th_2$)
  $Pk_d$ = peak ($p_{NA}, p_{NB}, p_{NC}$);  → find peak value of the bins
  $Pk_b$ = peak($p_{NF}, p_{NG}, p_{NH}$);  → find peak value of the bins
  $Sum_{db}$ = sum ($p_{NA}, p_{NB}, p_{NC}$);  → find sum of the bins
  $Sum_{bb}$ = sum ($p_{NF}, p_{NG}, p_{NH}$);  → find sum of the bins $$\gamma_d = \text{Gamma dark} = 1 - \frac{Pk_d \cdot (Sum_{db} - Th_2)}{Th_2}$$

$$\gamma_b = \text{Gamma bright} = 1 - \frac{Pk_b \cdot (Sum_{bb} - Th_2)}{Th_2}$$

4. Contrast enhancement (if 1, 2 and 3 are false):
If ($p_{ND} > Th_2$ and $p_{NE} > Th_2$)
  $Pk_d = p_{ND}$;  → value of $p_{ND}$
  $Pk_b = p_{NE}$;  → value of $p_{NE}$
  $Sum_{db} = p_{ND}$;  → value of $p_{ND}$
  $Sum_{bb} = p_{NE}$;  → value of $p_{NE}$ $$\gamma_d = \text{Gamma dark} = 1 + \frac{Pk_d \cdot (Sum_{db} - Th_2)}{Th_2}$$

$$\gamma_b = \text{Gamma bright} = 1 + \frac{Pk_b \cdot (Sum_{bb} - Th_2)}{Th_2}$$

5. Bypass the data with $\gamma_d = 1$ and $\gamma_b = 1$ if all of 1, 2, 3 and 4 conditions are false Wherein $\gamma_d$ and $\gamma_b$ are dark gamma value and bright gamma value, respectively.

In the example algorithm shown in Table 1, the entire gray scale dynamic range has been equally divided into two regions, which are referred to as dark and bright regions. The first 75% of the dark region bins ($p_{NA}$, $p_{NB}$ and $p_{NC}$) are considered for dark correction and last 75% of the bright region bins ($p_{NH}$, $p_{NG}$ and $p_{NF}$) are considered for bright correction. Whereas both the dark and bright region bins ($p_{NA}$, $p_{NB}$, $p_{NC}$ and $p_{NH}$, $p_{NG}$, $p_{NF}$) are considered for both dark/bright correction. The remaining mid-tone bins ($p_{ND}$ and $p_{NE}$) are considered for contrast enhancement.

As shown in the example algorithm in Table 1, the two threshold values $Th_1$ (only dark or bright threshold) and $Th_2$ (both dark/bright and contrast threshold) are used for deciding type and nature of the curve to be used for gray scale correction. In these embodiments, only dark or only bright threshold is said to be met if more than 50% of pixels are lying in either dark correction or bright correction regions, thus $Th_1$ is set to about 0.5 and correspondingly $Th_2$ is set to about 0.75*$Th_1$. The $Th_1$ and $Th_2$ can also be configured for other threshold values.

In these embodiments, either for dark or bright region correction, the computed gamma values are dependent on three factors namely peak, sum of bins under consideration and the threshold values. The normalized bins peak value will determine the strength of gamma to be applied. If the peak value is more, the strength of gamma will be more and vice versa. Whereas sum of the normalized bins and threshold values determine incremental change in gamma to be applied based on scene changes. The amount of sum of normalized bins deviation from threshold value controls the strength of gamma already determined by the peak value. If the deviation from sum of normalized bins to threshold is more, a higher factor of strength of gamma determined by peak is applied and vice versa. This assures the gray scale correction applied to be truly adaptive to scene changes without depending on any previous histogram's data. Further if desired, the strength of gamma can be made configurable by introducing another multiplication term K (e.g. range can be from 0.1 to 1.0) to the peak value in the gamma equations.

In these embodiments, if the incoming image scene characteristics are changing slowly, at a certain point in the input digital video signal, curve switching happens due to the cross-over of threshold values. The above described approach solves flicker problem to significant extent due to adaptive nature of strength of gamma. Further in the above described technique, for slow change in image characteristics, the gamma change applied is also small in-spite of huge difference in histograms of consecutive images in the image sequences. With these slow changing images, whenever threshold cross-over happens, curve will be switched. But the curve change automatically happens in small steps as images are moving slowly. This will virtually eliminate flicker with slow moving images. Also, this technique ensures that for large change in image characteristics, the curve change is fast and there by truly adaptive.

At step 140, a dark curve convergence value ($Y_d$) and a bright curve convergence value ($Y_b$) is computed using the gray scale dynamic range start and end points $C_{sp}$ and $C_{ep}$, respectively. The computed parameter $Y_d$ refers to end-point of dark region curve correction and the computed parameter $Y_b$ refers to start-point of bright region curve correction. In some embodiments, the nature of curve correction to be applied is based on various computed parameters, such as $Y_d$, $Y_b$, $\gamma_d$ and $\gamma_b$ based on below equation and the decision making algorithm shown in Table-1.

$$Y_d \text{ and } Y_b \text{ point} = (C_{ep} - C_{sp})/2$$

However in these embodiments, the convergence points $Y_d$ and $Y_b$ can also be configured to have other values, such that $Y_d > C_{sp}$, $Y_b < C_{ep}$ and $Y_d \leq Y_b$ for controlling the amount of gray scale correction curve stretch. The curve convergence parameters $Y_d$ and $Y_b$ can be configured to different values and not necessary to be the same value.

At step 150, a gray scale value associated with each pixel in the current or next video frame in the incoming digital input video signal is compared to the computed dark curve convergence value and the bright curve convergence value to determine whether to apply dark or bright region correction.

Figure 3:
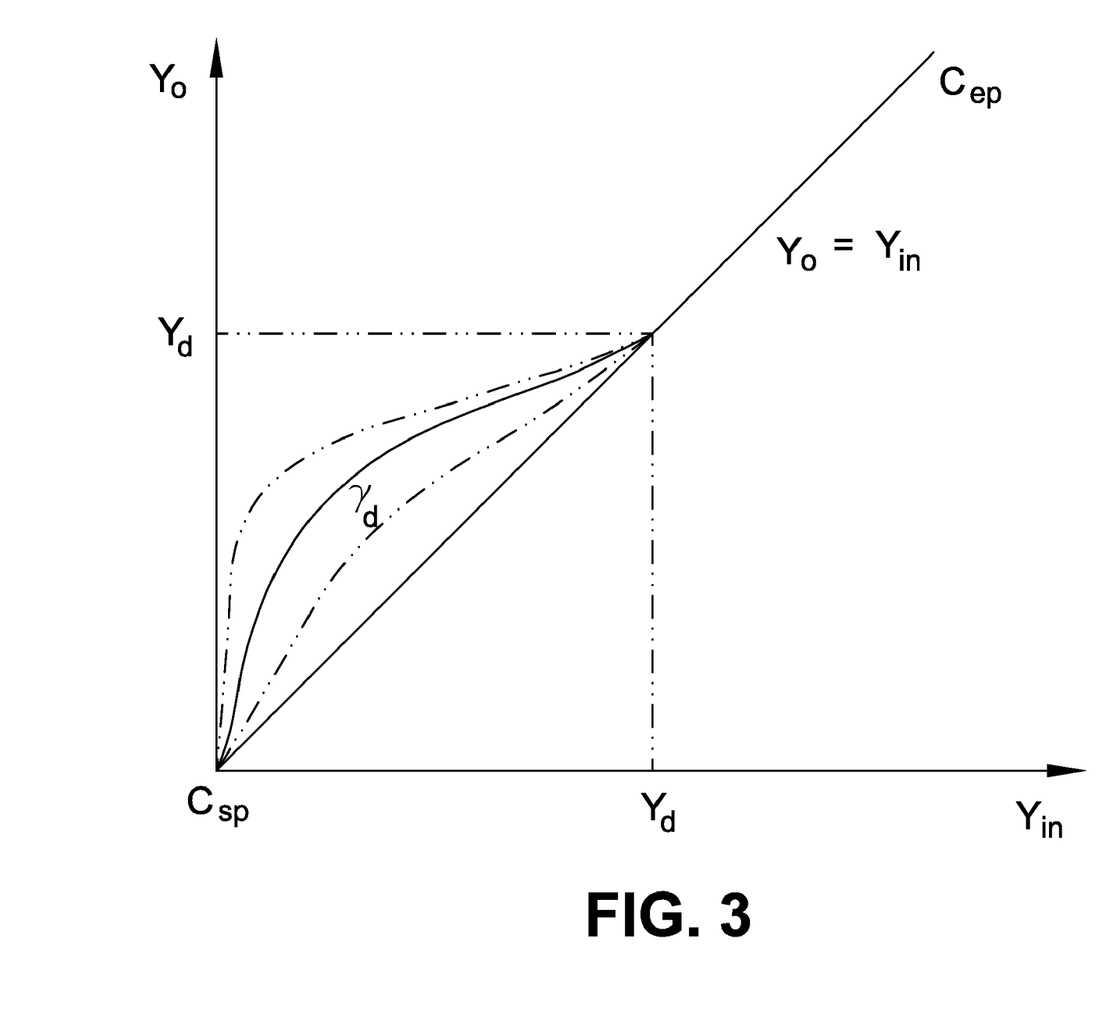
FIG. 3 is an example graph showing application of non-linear dynamic gamma curve modifications for dark correction.
Figure 4:
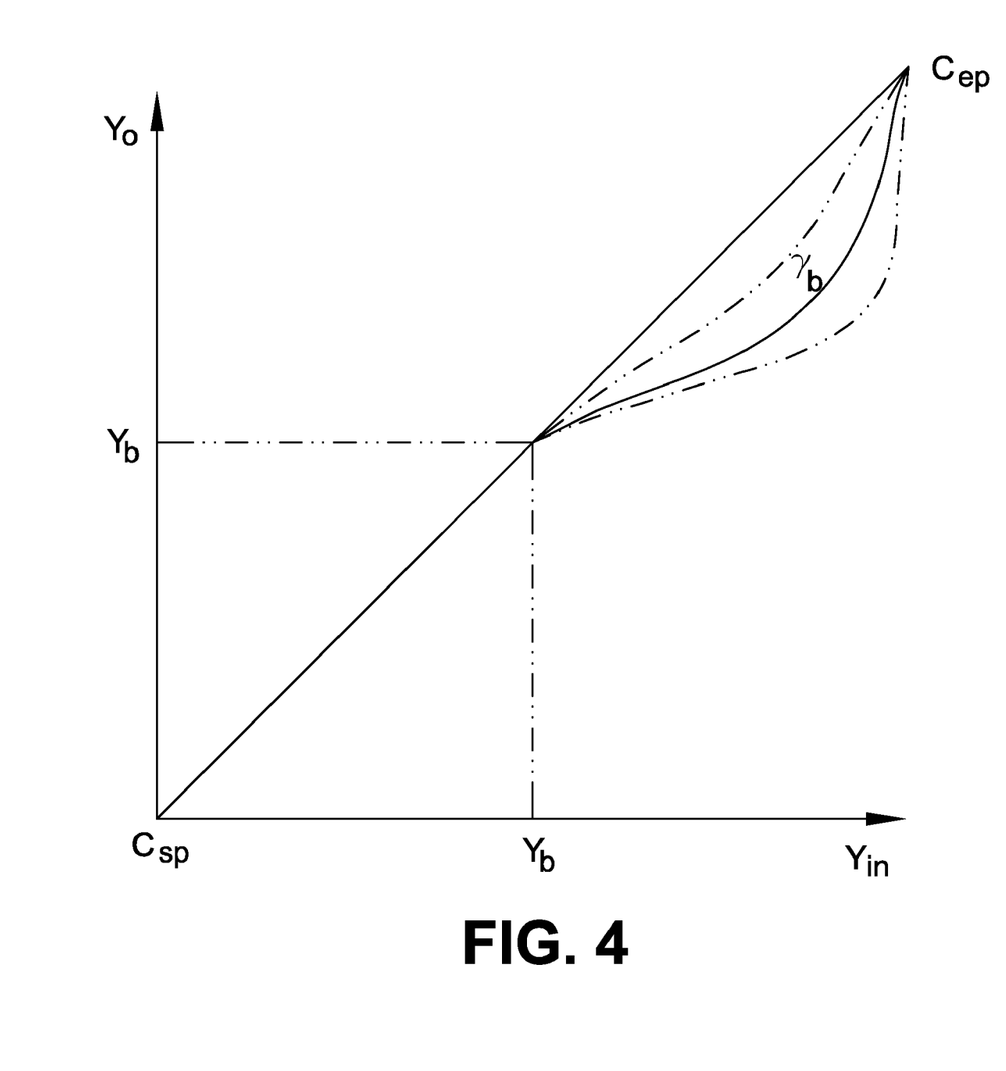
FIG. 4 is an example graph showing application of non-linear dynamic gamma curve modifications for bright correction.
Figure 5:
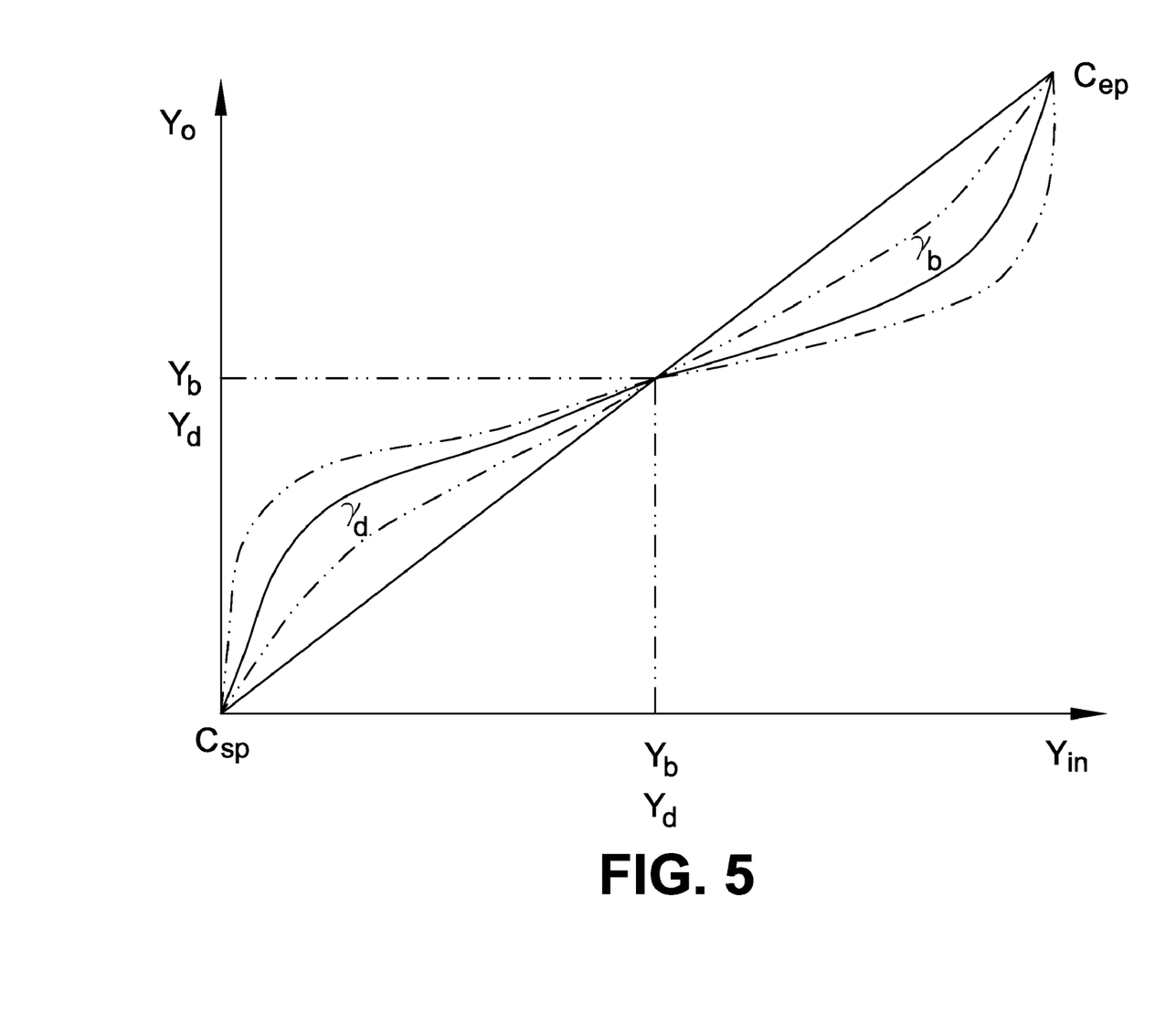
FIG. 5 is an example graph showing application of non-linear dynamic gamma curve modifications for dark and bright corrections.
Figure 6:
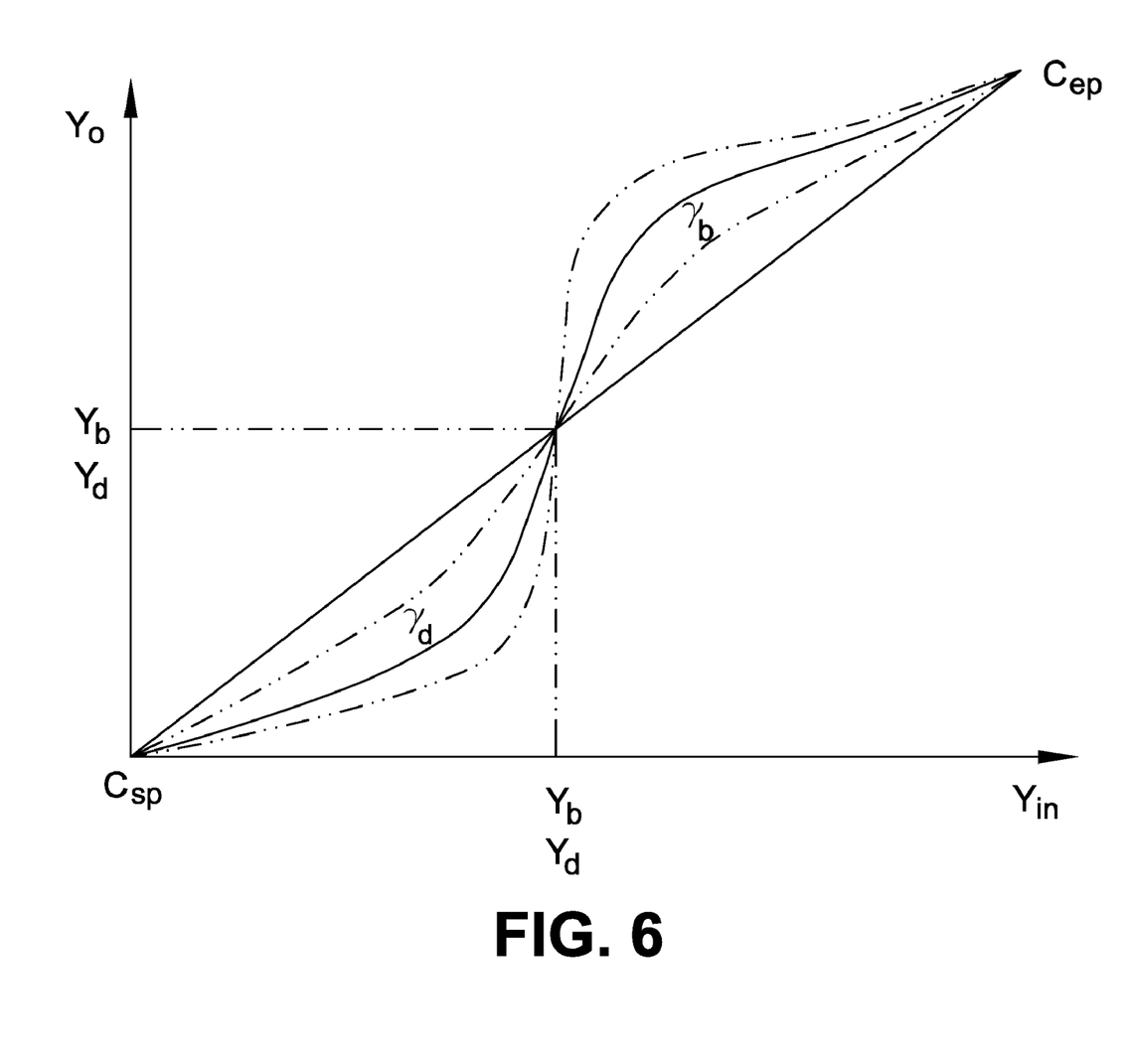
FIG. 6 is an example graph showing application of non-linear dynamic gamma curve modifications for contrast correction.

At step 160, a gray scale value correction is applied to each pixel in the current or next video frame using the dark gamma value and the bright gamma value computed in step 130 and based on the outcome of the comparison at step 150. In these embodiments, if gray scale pixel value <$Y_d$ then a dark gamma curve correction is applied as shown in FIG. 3, if the gray scale pixel value >$Y_b$ then a bright gamma curve correction is applied as shown in FIG. 4. The FIG. 5 and FIG. 6 show example application processes of dark and bright gamma curve corrections together and application of contrast gamma curve correction, respectively. In FIGS. 3-6, the horizontal axis represents the brightness axis and the vertical axis shows the correction quantity. The example non-linear dynamic gamma curve modification graphs shown in FIGS. 3 to 6 are represented by following equations for a 10-bit gray scale representation: $Y_{od} = Y_{in}$ {Dark region equation . . . . For $Y_{in} \leftarrow 0$ to $C_{sp}$}

$$Y_{od} = C_{sp} + POW\{2, X_d - [\gamma_d*(X_d - \log_2(Y_{in} - C_{sp}))]\}$$

{Dark region equation . . . For $Y_{in} \leftarrow C_{sp}$ to $Y_d$}

$$Y_{od} = Y_{ob} = \{\text{For } Y_{in} \leftarrow Y_d \text{ to } Y_b\}$$

$$Y_{ob} = C_{ep} - POW\{2, X_b - [\gamma_b*(X_b - \log_2(C_{ep} - Y_{in}))]\}$$

{Bright region equation . . . For $Y_m \leftarrow Y_b$ to $C_{ep}$}

$Y_{ob} = Y_{in}$ {Bright region equation . . . For $Y_{in} \leftarrow C_{ep}$ to 1023}

Wherein, $Y_{in}$ is an input gray scale value, $Y_d$ and $Y_b$ are points of curve convergence, $C_{sp}$ and $C_{ep}$ are dynamic range start and end points, $\gamma_d$ and $\gamma_b$ are dark and bright gamma values, $X_d$ is dark stretch parameter chosen such that $(Y_d - C_{sp}) = POW\{2, X_d\}$, $X_b$ is bright stretch parameter chosen such that $(C_{ep} - Y_b) = POW\{2, X_b\}$, $Y_{od}$ is a corrected gray scale output for the dark region, and $Y_{ob}$ is a corrected gray scale output for the bright region, and POW is a power function.

The above $Y_{od}$ equation applies for dark correction, both dark/bright and contrast corrections within the specified $Y_{in}$ limits. Similarly, $Y_{ob}$ equation applies for bright correction, both dark/bright and contrast corrections within the specified $Y_{in}$ limits. In these embodiments, $X_d$ and $X_b$ are configured along with $Y_d$ and $Y_b$ based on the above specified equations for controlling the amount of gray scale correction curve stretch.

At step 170, the method 100 checks whether there is another video frame in the incoming digital input video signal that needs the gray scale correction. Based on the determination at step 170, the method goes to step 110 if there is another video frame in the digital input video signal that needs DGC, otherwise the method goes to step 180 and ends the application of the DGC operation.

Although the flowchart 100 includes steps 110-180 that are arranged serially in the exemplary embodiments, other embodiments of the subject matter may execute two or more steps in parallel, using multiple processors or a single processor organized as two or more virtual machines or sub-processors. Moreover, still other embodiments may implement the steps as two or more specific interconnected hardware modules with related control and data signals communicated between and through the modules, or as portions of an application-specific integrated circuit. Thus, the exemplary process flow diagrams are applicable to software, firmware, and/or hardware implementations.

Figure 7:
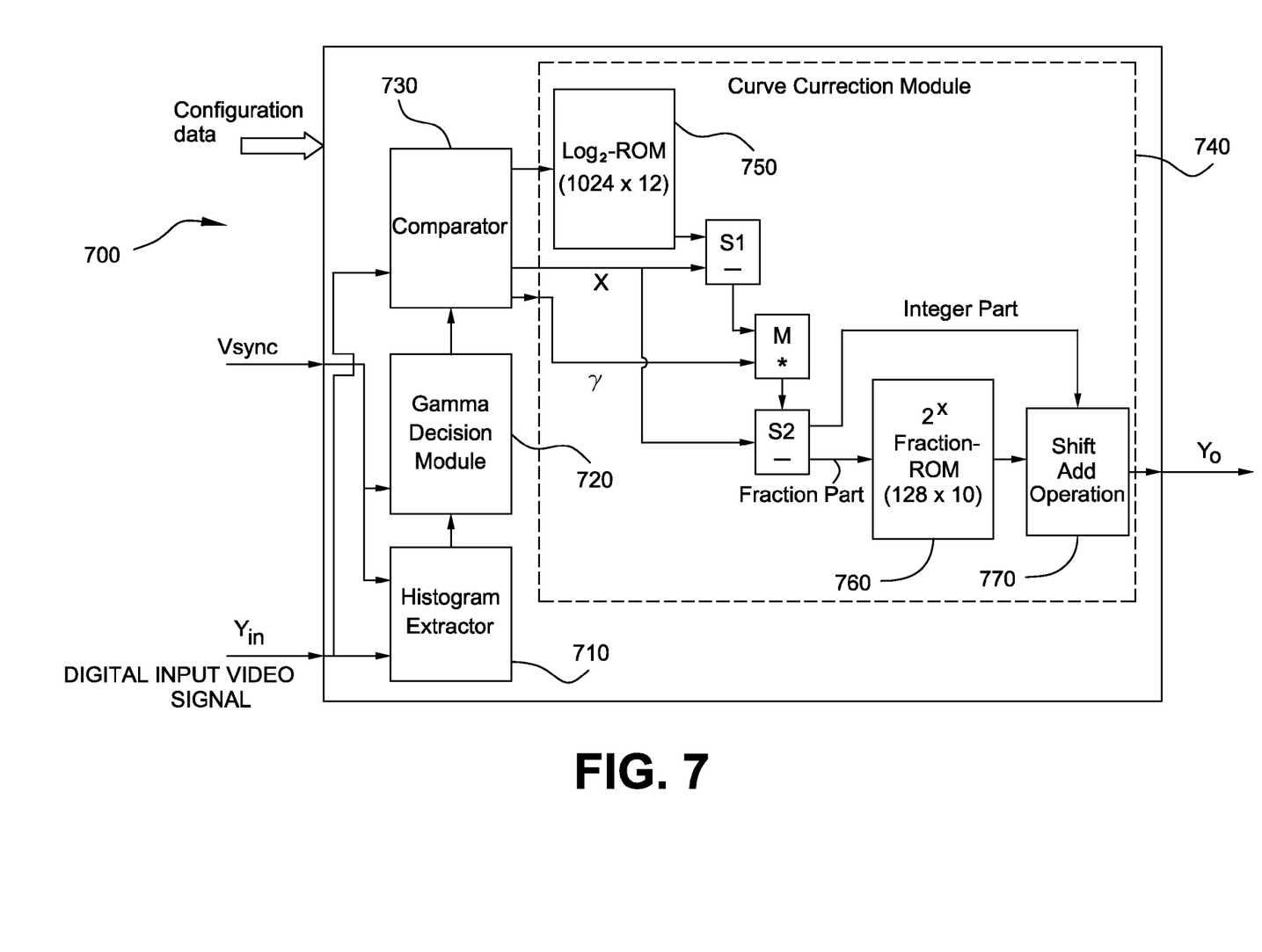
FIG. 7 is a block diagram of an apparatus used for implementing embodiments of the present subject matter shown in FIG. 1.

Referring now to FIG. 7, there is illustrated an apparatus 700 for applying DGC according to embodiment of the present invention. As shown in FIG. 7, the apparatus includes a histogram extractor 710, a gamma decision module 720 coupled to the histogram extractor 710, a comparator 730 coupled to the gamma decision module 720, and a curve correction module 740 coupled to the comparator 730. As shown in FIG. 7, the histogram extractor receives the digital input video signal ($Y_{in}$) including a sequence of video frames. In these embodiments, each video frame in the digital input video signal includes (m×n) pixels. Further as shown in FIG. 7, the gamma decision module and histogram extractor receives the $V_{sync}$ info. Also as shown in FIG. 7, the comparator 730 receives the $Y_{in}$. In addition as shown in FIG. 7, the apparatus 700 receives configuration info, such as image resolution factor, 8 or 10 bit pixel gray scale value, gamma strength multiplication factor, curve convergence points, thresholds and both dark and bright stretch parameters. The configuration of gamma strength multiplication factor, curve convergence points, thresholds and both the dark and bright stretch parameters are optional. Furthermore as shown in FIG. 7, the curve correction module 740 includes a $\log_2$-ROM (read-only memory) 750, a first subtractor (S1), a multiplier (M), a second subtractor (S2), $2^x$ Fraction-ROM 760, and shift and add operation block 770.

In operation, the histogram extractor 710 receives a sequence of fames from an incoming digital input video signal ($Y_{in}$) as shown in FIG. 7. The histogram extractor 710 then extracts histogram information from a current video frame and forms a histogram. The formed histogram includes a predetermined number of bins that are formed based on image luminance pixel values associated with the (m×n) pixels in the current video frame.

The gamma decision module 720 then computes a non-linear gamma curve using the histogram information associated with the current video frame received from the histogram extractor 710. In these embodiments, the gamma decision module 720 computes a dark gamma value and a bright gamma value using normalized bin values in each bin in the histogram. Further, the gamma decision module 720 computes a dark curve convergence value and a bright curve convergence value using gray scale dynamic range start and end points.

The comparator 730 then compares gray scale value associated with each pixel in the current or next video frame in the $Y_{in}$ to the computed dark curve convergence value and the bright curve convergence value and outputs appropriate gamma $\gamma(\gamma_d$ or $\gamma_b)$ and X ($X_d$ or $X_b$) to be applied on every pixel to the curve correction module.

The curve correction module 740, then applies the gray scale correction to each pixel in the current or next video frame using the computed dark gamma value and the bright gamma value as a function of the comparison. In some embodiments, the curve correction module applies the gamma curve correction using the following steps:

1) The $\log_2$-ROM is a ROM that stores the $\log_2$ values for entire dynamic range, which is of size 1024×12 bits. The value of ($Y_{in}-C_{sp}$) or ($C_{ep}-Y_{in}$) is used as address of this ROM depending on dark or bright region correction, respectively. The 12-bit in $\log_2$-ROM is representation of the values for integer and fraction parts (4 bits for integer and 8 bits for the fraction). The total memory requirement for the $\log_2$-ROM table is 1536 bytes. The example $\log_2$-ROM addresses, decimal equivalent of addresses, $\log_2$ values of the addresses and $\log_2$-ROM entries are as shown in below Table-2.

TABLE 2

| ($Y_{In} - C_{sp}$) OR ($C_{sp} - Y_{In}$) $\log_2$-ROM Address (10 bit) | Decimal equivalent of $\log_2$-ROM Address (a) | Decimal value of $\log_2 a$ | $\log_2$-ROM Entries (12 bit) |
|---|---|---|---|
| 0 0 0 0 0 0 0 0 0 1 | 1 | 0.000000000 | 0 0 0 0 0 0 0 0 0 0 0 0 |
| 0 0 0 0 0 0 0 0 1 0 | 2 | 1.000000000 | 0 0 0 1 0 0 0 0 0 0 0 0 |
| 0 0 0 0 0 0 0 0 1 1 | 3 | 1.584962501 | 0 0 0 1 1 0 0 1 0 1 0 1 |
| 0 0 0 0 0 0 0 1 0 0 | 4 | 2.000000000 | 0 0 1 0 0 0 0 0 0 0 0 0 |
| 0 0 0 0 0 0 0 1 0 1 | 5 | 2.321928095 | 0 0 1 0 0 1 0 1 0 0 1 0 |
| 0 0 0 0 0 0 0 1 1 0 | 6 | 2.584962501 | 0 0 1 0 1 0 0 1 0 1 0 1 |
| 0 0 0 0 0 0 0 1 1 1 | 7 | 2.807354922 | 0 0 1 0 1 1 0 0 1 1 1 0 |
| 0 0 0 0 0 0 1 0 0 0 | 8 | 3.000000000 | 0 0 1 1 0 0 0 0 0 0 0 0 |
| 0 0 0 0 0 0 1 0 0 1 | 9 | 3.169925001 | 0 0 1 1 0 0 1 0 1 0 1 1 |
| 0 0 0 0 0 0 1 0 1 0 | 10 | 3.321928095 | 0 0 1 1 0 1 0 1 0 0 1 0 |
| . . . . . . . . . . | . | . | . . . . . . . . . . . . |
| . . . . . . . . . . | . | . | . . . . . . . . . . . . |
| 1 1 1 1 1 1 0 1 1 0 | 1014 | 9.985841937 | 1 0 0 1 1 1 1 1 1 1 0 0 |
| 1 1 1 1 1 1 0 1 1 1 | 1015 | 9.987264012 | 1 0 0 1 1 1 1 1 1 1 0 0 |
| 1 1 1 1 1 1 1 0 0 0 | 1016 | 9.988684687 | 1 0 0 1 1 1 1 1 1 1 0 1 |
| 1 1 1 1 1 1 1 0 0 1 | 1017 | 9.990103964 | 1 0 0 1 1 1 1 1 1 1 0 1 |
| 1 1 1 1 1 1 1 0 1 0 | 1018 | 9.991521846 | 1 0 0 1 1 1 1 1 1 1 1 0 |
| 1 1 1 1 1 1 1 0 1 1 | 1019 | 9.992938336 | 1 0 0 1 1 1 1 1 1 1 1 0 |
| 1 1 1 1 1 1 1 1 0 0 | 1020 | 9.994353437 | 1 0 0 1 1 1 1 1 1 1 1 0 |
| 1 1 1 1 1 1 1 1 0 1 | 1021 | 9.995767151 | 1 0 0 1 1 1 1 1 1 1 1 0 |
| 1 1 1 1 1 1 1 1 1 0 | 1022 | 9.997179481 | 1 0 0 1 1 1 1 1 1 1 1 1 |
| 1 1 1 1 1 1 1 1 1 1 | 1023 | 9.998590430 | 1 0 0 1 1 1 1 1 1 1 1 1 |

2) The $\log_2$-ROM output is subtracted by the subtractor S1 from the value of X (4 bits for integer and 8 bits for fraction) which gives out a 12 bit result.

3) The multiplier M then multiplies 6 bit (1 bit integer and 5 bits fractional part) gamma value ($\gamma$) and 12 bit (4 bit for integer and 8 bit for fraction) output of subtractor S1 and outputs an 18 bit result (5 bits for integer and 13 bits for fraction).

4) The multiplier M output is then subtracted by subtractor S2 from the value of X and outputs an 18 bit magnitude (5 bits for integer and 13 bits for fraction) and a sign bit. Among the 18 bits of the subtractor S2 output, 7 MSB bits of the fractional part ([12:6]) are outputted to the $2^x$ Fraction-ROM without any modification if the sign bit is 0, else the value is subtracted from 1.0 if the sign bit is 1 and the resultant value is used as address of the $2^x$ Fraction-ROM. This operation is performed to reduce the size of the $2^x$ Fraction-ROM, by avoiding need for negative values (i.e., $2^{-x}$ values) storage. The 5 MSB bits [17:13] of subtractor S2 output are passed to the shift and add block along with the sign bit.

5) The $2^x$ Fraction-ROM translates the said address to 10-bit $2^x$ value, which is of size 128×10 bits. Hence, the total memory requirement for the $2^x$ table is 160 bytes. First and last few addresses, decimal equivalent of addresses, $2^x$ values of the addresses and $2^x$ Fraction-ROM entries are as shown in Table-3.

TABLE 3

| $2^x$ Fraction-ROM Address (7 bit) | Decimal equivalent of $2^x$ Fraction-ROM Address (b) | $2^b$ Value | $2^x$ Fraction-ROM Entries (10 bit) |
|---|---|---|---|
| 0 0 0 0 0 0 0 | 0.0000000000 | 1.0000000000 | 0 0 0 0 0 0 0 0 0 0 |
| 0 0 0 0 0 0 1 | 0.0078125000 | 1.0054299011 | 0 0 0 0 0 0 0 1 0 1 |
| 0 0 0 0 0 1 0 | 0.0156250000 | 1.0108892861 | 0 0 0 0 0 0 1 0 1 1 |
| 0 0 0 0 0 1 1 | 0.0234375000 | 1.0163783149 | 0 0 0 0 0 1 0 0 0 0 |
| 0 0 0 0 1 0 0 | 0.0312500000 | 1.0218971487 | 0 0 0 0 0 1 0 1 1 0 |
| 0 0 0 0 1 0 1 | 0.0390625000 | 1.0274459491 | 0 0 0 0 0 1 1 1 0 0 |
| 0 0 0 0 1 1 0 | 0.0468750000 | 1.0330248790 | 0 0 0 0 1 0 0 0 0 1 |
| 0 0 0 0 1 1 1 | 0.0546875000 | 1.0386341020 | 0 0 0 0 1 0 0 1 1 1 |
| 0 0 0 1 0 0 0 | 0.0625000000 | 1.0442737824 | 0 0 0 0 1 0 1 1 0 1 |
| 0 0 0 1 0 0 1 | 0.0703125000 | 1.0499440858 | 0 0 0 0 1 1 0 0 1 1 |
| . . . . . . . | . . . . . . . | . . . . . . . | . . . . . . . . . . |
| . . . . . . . | . . . . . . . | . . . . . . . | . . . . . . . . . . |
| . . . . . . . | . . . . . . . | . . . . . . . | . . . . . . . . . . |
| 1 1 1 0 1 1 0 | 0.9218750000 | 1.8945759816 | 1 1 1 0 0 1 0 1 0 0 |
| 1 1 1 0 1 1 1 | 0.9296875000 | 1.9048633418 | 1 1 1 0 0 1 1 1 1 0 |
| 1 1 1 1 0 0 0 | 0.9375000000 | 1.9152065614 | 1 1 1 0 1 0 1 0 0 1 |
| 1 1 1 1 0 0 1 | 0.9453125000 | 1.9256059436 | 1 1 1 0 1 1 0 0 1 1 |
| 1 1 1 1 0 1 0 | 0.9531250000 | 1.9360617935 | 1 1 1 0 1 1 1 1 1 0 |
| 1 1 1 1 0 1 1 | 0.9609375000 | 1.9465744176 | 1 1 1 1 0 0 1 0 0 1 |
| 1 1 1 1 1 0 0 | 0.9687500000 | 1.9571441242 | 1 1 1 1 0 1 0 1 0 0 |
| 1 1 1 1 1 0 1 | 0.9765625000 | 1.9677712232 | 1 1 1 1 0 1 1 1 1 0 |
| 1 1 1 1 1 1 0 | 0.9843750000 | 1.9784560264 | 1 1 1 1 1 0 1 0 0 1 |
| 1 1 1 1 1 1 1 | 0.9921875000 | 1.9891988470 | 1 1 1 1 1 1 0 1 0 0 |

6) The shift and add operation block 770 receives 5 MSB bits of the subtractor S2 output along with sign bit and shifts the $2^x$ Fraction-ROM output right if the sign bit is 1 or left if the sign bit is 0. The $2^x$ Fraction-ROM output is shifted left or right by the number of bits which is decimal equivalent of the received 5 MSB bits.

7) The final output is then obtained by applying one of the two below equations, i.e., the $Y_{od}$ equation is applied to dark region pixels and the $Y_{ob}$ equation is applied to bright region pixels.

$$Y_{od} = Y_{oc} + C_{sp}$$

$$Y_{ob} = C_{ep} - Y_{oc}$$

wherein, $Y_{oc}$ is an output from the curve correction module 740. In some embodiments, the 10 bit $Y_{od}$ or $Y_{ob}$ output is the final dynamic gamma corrected gray scale value. The total memory requirement shown in the above example design for $\log_2$-ROM 750 and $2^x$ Fraction-ROM 760 is about 1696 bytes. This is even less than the memory required for storing just 2 pre-computed correction curves in LUT methods, which requires 2560 bytes (gray scale dynamic range*number of bits per pixel luma value*number of curves/8=1024*10*2/8).

In some embodiments, the gamma output value from the gamma decision module 720 is represented by 6 bits (1 bit integer and 5 bits fractional part). This results in 256 possible number correction curves (i.e., 64 curves each for 4 enhancement types) for a given set of $Y_d$ and $Y_b$, which can be used for dynamic switching between video frames with just 1696 bytes of memory. This memory required is considerably less than what is required for LUT method to store the 256 pre-computed curves, which can be about 327680 bytes (number of different curves*gray scale dynamic range*number of bits per pixel luma value/8=256*1024*10/8) of memory for each set of $Y_d$ and $Y_b$ values. In addition to this, the LUT method can require additional 1280 bytes (gray scale dynamic range*number of bits per pixel luma value/8=1024*10/8) of memory to load and use one of the pre-computed correction curves.

The operation of the apparatus 700 is explained in more detail with reference to FIGS. 1-6.

The above-described technique enhances image feature details and contrast without introducing any image artifacts, by keeping the transfer characteristics curve smooth (without having any sharp transitions). Further, the above technique enhances image feature details and contrast using a significantly lower number of histogram bins, thereby reducing the hardware complexity. Furthermore, the above technique requires memory less than that of necessary for storing even just two pre-computed correction curves in LUT method, and hence significantly reduces the memory requirement. The above technique is not restricted by memory size as it only requires storage equivalent to less than that of just two pre-computed correction curves. The above technique virtually eliminates flicker by applying an adaptive gamma value manipulation algorithm as described above. The curve switching decision in the above described technique is based on histogram normalized bin values and thresholds. The above technique applies the gray scale correction in real time as needed for High Definition (HD) frame resolutions with either 8 or 10 bit representation of gray scale values with just about seven pixel clock cycles latency. The above dynamic gamma controller can be easily integrated into a video post processing Application specific integrated circuits (ASIC), without requiring any additional Analog/Mixed signal devices. The above technique achieves gray scale correction deviation within 1% of the theoretical non-linear gamma curve values. This deviation can be further reduced by increasing the size of ROMs.

Although the above DGC application technique is explained with reference to a sequence of images received from an incoming digital input video signal, the above described DGC technique can be applied to still images as well.

The above technique can be implemented using an apparatus controlled by a processor where the processor is provided with instructions in the form of a computer program constituting an aspect of the above technique. Such a computer program may be stored in storage medium as computer readable instructions so that the storage medium constitutes a further aspect of the present subject matter.

The above description is intended to be illustrative, and not restrictive. Many other embodiments will be apparent to those skilled in the art. The scope of the subject matter should therefore be determined by the appended claims, along with the full scope of equivalents to which such claims are entitled.

As shown herein, the present subject matter can be implemented in a number of different embodiments, including various methods, a circuit, an I/O device, a system, and an article comprising a machine-accessible medium having associated instructions.

Other embodiments will be readily apparent to those of ordinary skill in the art. The elements, algorithms, and sequence of operations can all be varied to suit particular requirements. The operations described-above with respect to the method illustrated in FIG. 1 can be performed in a different order from those shown and described herein.

FIGS. 1-7 are merely representational and are not drawn to scale. Certain proportions thereof may be exaggerated, while others may be minimized. FIGS. 1-7 illustrate various embodiments of the subject matter that can be understood and appropriately carried out by those of ordinary skill in the art.

In the foregoing detailed description of the embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive invention lies in less than all features of a single disclosed embodiment. Thus the following claims are hereby incorporated into the detailed description of the embodiments of the invention, with each claim standing on its own as a separate preferred embodiment.

The invention claimed is:

1. A processor implemented method for dynamically applying gray scale correction on a frame-by-frame basis to an incoming digital input video signal, wherein each video frame has (m×n) pixels comprising:
dynamically computing non-linear gamma curves using histogram data extracted from a current video frame using the processor; and
applying the gray scale correction to each pixel in the current or next video frame as a function of the computed non-linear gamma curves using the processor, comprising:
comparing gray scale value of each pixel in the current or next video frame to a dark curve convergence value and a bright curve convergence value; and
applying the gray scale correction to each pixel in the current or next video frame using a dark gamma value and a bright gamma value as a function of the comparison.

2. The method of claim 1, wherein dynamically computing the non-linear gamma curves using the histogram data extracted from the current video frame comprises:
forming the histogram having a predetermined number of bins as a function of image gray scale pixel values for a current video frame.

3. The method of claim 2, wherein, in forming the histogram, size of each bin in the histogram has equal divisions of full gray scale dynamic range in the current video frame.

4. The method of claim 2, wherein, in forming the histogram, for 8-bit gray scale representation the predetermined number of bins is about 8 to 256 and for 10-bit gray scale representation the predetermined number of bins is about 8 to 1024.

5. A processor implemented method for dynamically applying gray scale correction on a frame-by-frame basis to an incoming digital input video signal, wherein each video frame has (m×n) pixels comprising:
dynamically computing non-linear gamma curves using histogram data extracted from a current video frame using the processor, comprising forming the histogram having a predetermined number of bins as a function of image gray scale pixel values for a current video frame; and
applying the gray scale correction to each pixel in the current or next video frame as a function of the computed non-linear gamma curves using the processor, comprising:
computing a dark gamma value and a bright gamma value using bin values in each bin;
computing a dark curve convergence value and a bright curve convergence value using gray scale dynamic range start and end points;
comparing gray scale value of each pixel in the current or next video frame to the computed dark curve convergence value and the bright curve convergence value; and
applying the gray scale correction to each pixel in the current or next video frame using the computed dark gamma value and the bright gamma value as a function of the comparison.

6. The method of claim 5, further comprising:
normalizing each bin value in the formed histogram, and wherein each bin value comprises an associated number of pixels;
obtaining normalized bin peak and sum values and dark, bright, and contrast thresholds from each normalized bin value; and
computing the dark gamma value and the bright gamma value using normalized bin peak and sum values and dark, bright, and contrast thresholds associated with each normalized bin value.

7. The method of claim 5, further comprising:
determining whether there is another video frame in the digital input video signal that requires applying the dynamic gray scale correction; and
if so, then repeating the steps of dynamically computing and applying the gray scale correction.

8. An apparatus for dynamically applying gray scale correction on a frame-by-frame basis to an incoming digital video signal, wherein each video frame has (m×n) pixels comprising:
a gamma decision module dynamically computes a non-linear gamma curve using histogram information associated with a current video frame;
a curve correction module coupled to the gamma decision module dynamically applies the gray scale correction to each pixel in the current or next video frame as a function of the computed non-linear gamma curve; and
a comparator coupled to the gamma decision module compares gray scale value of each pixel in the current or next video frame to a dark curve convergence value and a bright curve convergence value, and wherein the curve correction module applies the gray scale correction to each pixel in the current or next video frame using a dark gamma value and a bright gamma value as a function of the comparison.

9. The apparatus of claim 8, wherein a gray scale dynamic range start and end points are configurable by gray scale dynamic range start and end points to provide gray scale correction in a predetermined dynamic range.

10. An apparatus for dynamically applying gray scale correction on a frame-by-frame basis to an incoming digital video signal, wherein each video frame has (m×n) pixels comprising:
a gamma decision module dynamically computes a non-linear gamma curve using histogram information associated with a current video frame;

a curve correction module coupled to the gamma decision module dynamically applies the gray scale correction to each pixel in the current or next video frame as a function of the computed non-linear gamma curve;

a histogram extractor coupled to the gamma decision module, wherein the histogram extractor extracts histogram information from the current video frame and forms a histogram having a predetermined number of bins as a function of image luminance pixel values in the current video frame, and wherein the gamma decision module computes a dark gamma value and a bright gamma value using each normalized bin peak and sum values and dark, bright and contrast thresholds, wherein the gamma decision module further computes a dark curve convergence value and a bright curve convergence value using gray scale dynamic range start and end points; and a comparator coupled to the gamma decision module compares gray scale value of each pixel in the current or next video frame to the computed dark curve convergence value and the bright curve convergence value, and wherein the curve correction module applies the gray scale correction to each pixel in the current or next video frame using the computed dark gamma value and the bright gamma value as a function of the comparison.

11. The apparatus of claim 10, wherein each bin in the histogram has equal divisions of full gray scale dynamic range in the current video frame.

12. The apparatus of claim 10, wherein the predetermined number of bins is about 8 to 1024 for 10-bit gray scale representation.

13. A non-transitory computer readable storage medium encoded with instructions, which when executed by a computing system, results in execution of a method for dynamically applying gray scale correction on a frame-by-frame basis to an incoming digital input video signal, wherein each video frame has (m×n) pixels, the method comprising:

dynamically computing non-linear gamma curves using histogram data extracted from a current video frame; and applying the gray scale correction to each pixel in the current or next video frame as a function of the computed non-linear gamma curves, comprising:

comparing gray scale value of each pixel in the current or next video frame to a dark curve convergence value and a bright curve convergence value; and applying the gray scale correction to each pixel in the current or next video frame using a dark gamma value and a bright gamma value as a function of the comparison.

14. The method of claim 13, wherein dynamically computing the non-linear gamma curves using the histogram data extracted from the current video frame comprises:

forming the histogram having a predetermined number of bins as a function of image gray scale pixel values for a current video frame.

15. The method of claim 14, wherein, in forming the histogram, size of each bin in the histogram has equal divisions of full gray scale dynamic range in the current video frame.

* * * * *